E. D. HASSENPLUG.
AXLE SKEIN.
APPLICATION FILED NOV. 3, 1908.
937,936.
Patented Oct. 26, 1909.
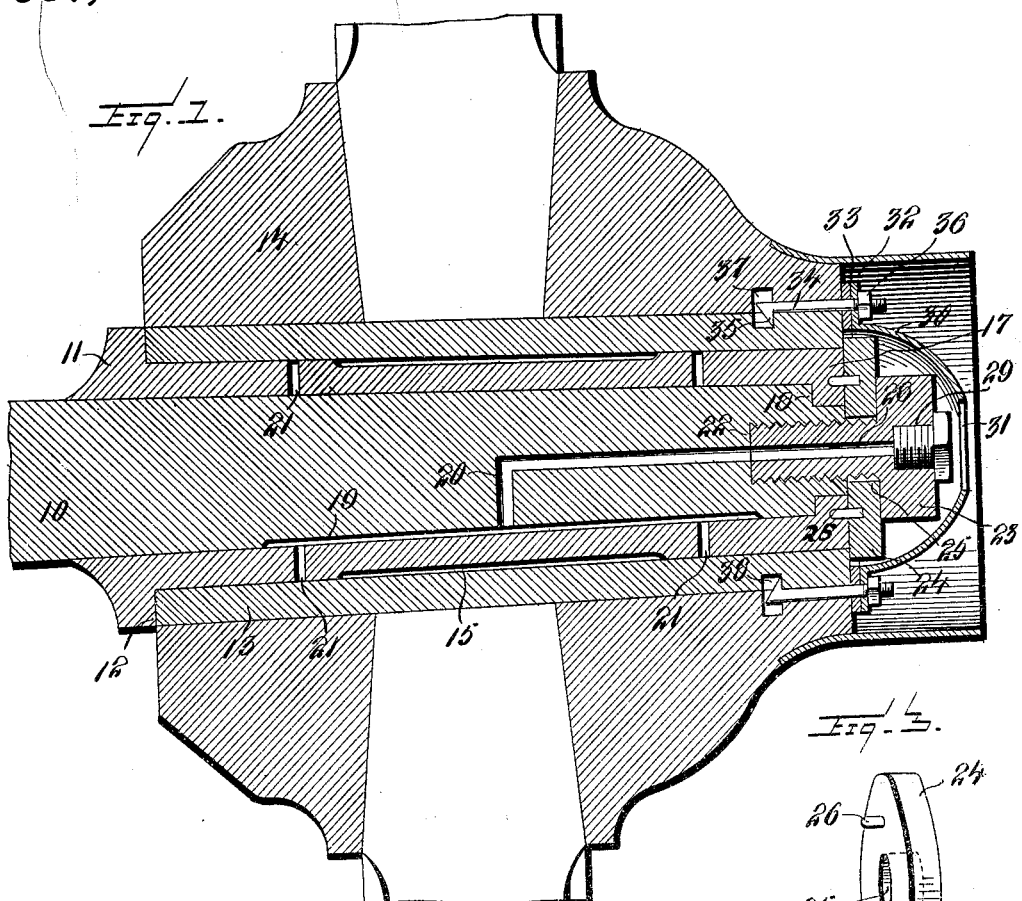
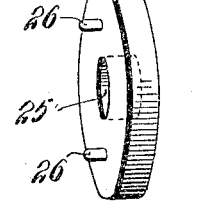
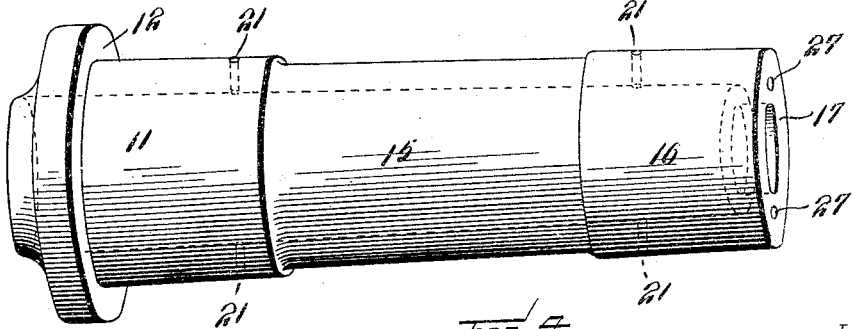
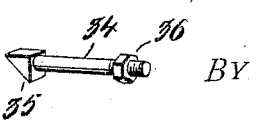
WITNESSES:
INVENTOR
Elmer D. Hassenplug.
BY
E. B. Stocking
Attorney

UNITED STATES PATENT OFFICE.

ELMER D. HASSENPLUG, OF GREENVILLE, PENNSYLVANIA.

AXLE-SKEIN.

937,936.  Specification of Letters Patent.  Patented Oct. 26, 1909.

Application filed November 3, 1908. Serial No. 460,917.

*To all whom it may concern:*

Be it known that I, ELMER D. HASSENPLUG, a citizen of the United States, residing at Greenville, county of Mercer, and State of Pennsylvania, have invented certain new and useful Improvements in Axle-Skeins, of which the following is a specification, reference being had therein to the accompanying drawing.

This invention relates to an axle skein, and particularly to a construction thereof embodying means for lubricating a wheel bearing thereon, and retaining the skein and wheel in position.

The invention has for an object to provide a novel and improved construction of skein provided with an inturned shoulder at its outer end and with lubricating channels adapted to communicate with a feed passage through the body of the axle.

Another object of the invention is to provide a novel and improved construction of oil cap adapted to be secured to the wheel hub to prevent the escape of lubricant therefrom.

Other and further objects and advantages of the invention will be hereinafter fully set forth and the novel features thereof defined by the appended claims.

In the drawing:—Figure 1 is a vertical section of a wheel hub showing the parts assembled therein; Fig. 2 is a detail perspective of the skein; Fig. 3 is a similar view of the retaining disk; Fig. 4 is a perspective of the cap retaining bolt.

Like numerals refer to like parts in the several views of the drawing.

The numeral 10 designates the wheel axle which may be of any desired cross section, either curved or angular and is preferably tapering, as shown in Fig. 1, so that when the skein 11 is forced longitudinally thereon it is wedged against rotative movement. This skein is formed at its rear with a bearing shoulder 12 against which the axle box 13 abuts, said box being disposed in any desired construction of wheel hub, for instance as shown at 14. The skein is formed intermediate of its ends with a lubricating groove or channel 15, the same being shown in Fig. 2 as extending circumferentially about the skein, while the outer end 16 of the skein is provided with an inturned flange 17 adapted to abut the shoulder 18 upon the axle 10 and thus retain the parts against longitudinal movement upon each other. The axle 10 is provided with a lubricating groove 19 extended longitudinally thereof and communicating with the passage 20 through the body of the axle. The groove 19 also communicates with the openings 21 formed in the skein, these parts being duplicated upon opposite sides so that the skein may be reversed in position by a partial rotation thereof. The lubricant is fed from the passage 21 to the axle box 13 and thence passes into the channel 15 and there retained as in a reservoir to be fed during the rotation of the wheel.

The passage 20 terminates at the outer end of the axle in a threaded recess 22 into which the holding screw bolt 23 is introduced. Interposed between the head of this screw and the flange 17 of the skein is a holding disk 24 which is of sufficient diameter to extend beyond the skein and overlap the joint between it and the axle box 13 thus preventing relative movement of the parts and the escape of lubricant between these members. The disk 24 is provided with a central unthreaded opening 25 and with pins or lugs 26 upon its inner faces adapted to enter coöperating sockets 27 formed in the flange 17. By this means a rotative movement of the disk is prevented and its effectual clamping secured. The holding bolt 23 is provided with a channel 28 coöperating with the passage 20, and the outer end of the channel 28 is normally closed by a plug 29 threaded into the bolt 23.

In order to prevent the escape or dripping of lubricant and also to protect the end of the skein connection, an oil cap 30 having an opening 31 in its end is attached to the hub by means of the flange 32. Interposed between this flange and the hub body is a packing washer 33 and the cap is held in position by means of the hook bolts 34, as shown in Fig. 4. These bolts are provided at one end with a hooked portion 35 extending laterally at one side from the bolt, and at the opposite end with a clamping nut 36 threaded thereon. The bolts are disposed within the hub and the hook portion thereof adapted to extend from the recess 37 in the hub into the recess 38 in the axle box thus securing these parts together and also retaining the cap in position. The hooked end 35 of the bolts may be drawn into the recesses 37 so as to permit the free introduction of the hub upon the box and are then partially rotated to bring the hook portion in the recesses 38 within the axle box.

In the application of the invention it will be seen that the lubricant is fed from the axle and skein to the outer surface of the latter and there retained by the channel so as to effectually lubricate the parts. The skein is also provided with feeding passages at different portions thereof so as to permit its reversal in wear which is important owing to the unequal strain or wear upon one face thereof. This skein can also be readily removed from the axle, while its shoulder prevents a longitudinal movement thereof relative to the axle which cannot occur when the securing bolt and disk are used to draw the parts into proper position. It will also be noted that the retaining disk is clamped by this bolt into locked relation with the skein end and projects over the joint between the skein and axle box thus preventing any longitudinal play of the wheel and also the escape of lubricant from the wearing parts. Any lubricant escaping at the edges of this disk is caught and retained by the oil cap so as to prevent dripping thereof from the wheel. This disk also forces the skein and axle into proper position and retains them, it being itself held against rotation by the pins entering the skein. The hook bolts by which the oil cap is retained in position also act to draw the axle box tightly into the hub. The invention therefore presents a simple, efficient and economically constructed form of axle skein by which a free lubrication of the wheel bearing is secured and the escape of such lubricant prevented, while retaining the parts in their proper position.

Having described my invention and set forth its merits, what I claim and desire to secure by Letters Patent is:—

1. The combination with an axle having a channel upon its periphery and a passage extending inward from its outer end to communicate with said channel, of a skein disposed upon said axle and having lateral passages communicating with said channel therein and formed with a circumferential holding channel extending entirely around its periphery intermediate said lateral passages and the ends of the skein, an axle box mounted upon said skein, and means mounted upon the axle for retaining the parts in position thereon.

2. An axle skein provided with a lubricating channel upon its outer surface and a feed passage therethrough, an axle disposed within said skein and having a feed passage communicating with the passage in the skein, an axle box mounted upon the outer face of said skein, securing means mounted upon the axle for retaining said parts in position, and a retaining disk disposed between said means and axle end and having means to engage said skein to hold it against rotation.

3. An axle skein provided with a lubricating channel upon its outer surface and a feed passage therethrough, an axle disposed within said skein and having a feed passage communicating with the passage in the skein, an axle box mounted upon the outer face of said skein, a securing bolt mounted upon the axle for retaining said parts in position, a retaining disk disposed between said bolt and axle end, and projecting lugs from said disk adapted to enter recesses in the skein end.

4. An axle skein provided with a lubricating channel upon its outer surface and a feed passage therethrough and an inturned flange at the outer end thereof, an axle disposed within said skein and having a feed passage communicating with the passage in the skein, an axle box mounted upon the outer face of said skein, a securing bolt mounted upon the axle for retaining said parts in position, and a retaining disk disposed between said bolt and axle end and provided with means to engage said skein and hold said disk against rotation.

5. An axle skein provided with a lubricating passage therethrough and having a shoulder at its inner end and an inturned flange at its outer end, an axle disposed within said skein and formed with a coöperating lubricating passage, an axle box mounted upon said skein to engage the shoulder thereof, a screw bolt mounted in said axle, and means held by said bolt to retain the skein and axle box in position.

6. An axle skein provided with a lubricating passage therethrough and an inturned flange at its outer end, an axle disposed within said skein and formed with a coöperating lubricating passage, a screw bolt mounted in said axle to retain the parts in position, an axle box surrounding said skein, and a retaining disk disposed between said skein and bolt and extended over a portion of the end of the axle box.

7. An axle skein provided with a lubricating passage therethrough and an inturned flange at its outer end, an axle disposed within said skein and formed with a coöperating lubricating passage, a screw bolt mounted in said axle to retain the parts in position, an axle box surrounding said skein, and a disk extended over a portion of the end of the axle box and having a central unthreaded opening and a retaining lug on its rear face to engage said skein.

8. An axle skein, an axle box mounted thereon and provided with a recess in its periphery, a hub upon said axle box formed with a coöperating recess, an oil cap, and a securing bolt extending from said cap and having a head adapted to enter either recess.

9. An axle skein, an axle box mounted thereon and provided with a recess in its periphery, a hub upon said axle box formed with a coöperating recess, an oil cap, a securing bolt extending from said cap and having a head adapted to enter either recess, a flange carried by said oil cap, and a packing disposed between said flange and hub.

10. An axle skein, an axle, an axle box mounted upon said skein, securing devices at the end of said skein and box, a hub mounted upon said axle box and having a recess therein, an oil cap inclosing said securing devices, and a holding bolt for said oil cap having a lateral projection at one end and mounted for rotative movement to shift said projection from the recess in the hub into engagement with the axle box.

In testimony whereof I affix my signature in presence of two witnesses.

ELMER D. HASSENPLUG.

Witnesses:
F. B. McCartney,
H. D. Aubel.